(12) United States Patent
Usami et al.

(10) Patent No.: US 9,786,330 B1
(45) Date of Patent: Oct. 10, 2017

(54) SHIELD FOR EXTERNAL WELDS OF HERMETICALLY SEALED ELECTRONICS DEVICES

(71) Applicant: HGST Netherlands B.V., Amsterdam (NL)

(72) Inventors: Yoshiya Usami, Tokyo (JP); Masahiko Tamura, Kanagawa (JP); Hirokazu Tanizawa, Kanagawa (JP); Koichi Suzuki, Kanagawa (JP)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 15/003,195

(22) Filed: Jan. 21, 2016

(51) Int. Cl.
*G11B 33/14* (2006.01)
*G11B 33/02* (2006.01)

(52) U.S. Cl.
CPC ........ *G11B 33/1493* (2013.01); *G11B 33/027* (2013.01); *G11B 33/1446* (2013.01)

(58) Field of Classification Search
CPC ... G11B 33/14; G11B 33/1493; G11B 33/027; G11B 33/1446
USPC .................. 360/97.21, 97.2, 97.22
See application file for complete search history.

(56) References Cited

U.S. PATENT DOCUMENTS

| | | | |
|---|---|---|---|
| 5,535,092 A | 7/1996 | Bang | |
| 5,600,509 A * | 2/1997 | Kawakami | G11B 33/121 360/97.21 |
| 5,668,686 A * | 9/1997 | Shouji | G11B 5/3903 360/319 |
| 5,880,910 A * | 3/1999 | Shouji | G11B 5/3903 360/322 |
| 6,108,163 A | 8/2000 | Boutaghou | |
| 6,392,838 B1 * | 5/2002 | Hearn | G11B 25/043 29/603.03 |
| 6,496,362 B2 | 12/2002 | Osterhout et al. | |
| 6,661,604 B2 | 12/2003 | Hashizume et al. | |
| 6,729,014 B2 * | 5/2004 | Lin | B82Y 10/00 29/603.14 |
| 6,833,979 B1 * | 12/2004 | Knapp | B82Y 10/00 360/322 |
| 7,218,473 B2 | 5/2007 | Bernett et al. | |
| 7,471,509 B1 | 12/2008 | Oliver | |
| 7,701,705 B1 | 4/2010 | Szeremeta | |
| 8,035,916 B2 | 10/2011 | Marlow et al. | |
| 8,564,900 B2 | 10/2013 | Hirono et al. | |
| 2006/0120031 A1 | 6/2006 | Zayas | |
| 2013/0222947 A1 * | 8/2013 | Sugii | G11B 23/505 360/99.08 |
| 2016/0104515 A1 * | 4/2016 | Strange | G11B 25/043 360/99.18 |

FOREIGN PATENT DOCUMENTS

WO 9634390 10/1996

* cited by examiner

*Primary Examiner* — Allen T Cao
(74) *Attorney, Agent, or Firm* — Kunzler Law Group, PC (57) ABSTRACT

Described herein is a system that includes a hard disk drive. The hard disk drive includes a base and a cover welded to the base by a weld bead. The base and the cover form a hermetically sealed housing. The system further includes a shield, coupled to an exterior of the hermetically sealed housing over the weld bead. The shield also is spaced-apart from the weld bead.

18 Claims, 6 Drawing Sheets

SHIELD FOR EXTERNAL WELDS OF HERMETICALLY SEALED ELECTRONICS DEVICES

FIELD

This disclosure relates generally to hermetically sealed electronic devices, and more particularly to protecting external welds of hermetically sealed hard disk drives from impact damage.

BACKGROUND

Electronic devices, such as electronic information storage apparatuses, which include hard disk drives, are commonly used for storing and retrieving digital information. For example, hard disk drives utilize rapidly rotating discs or platters coated with magnetic material to store information. The discs and other electrical components essential to operation are contained within a housing of the hard disk drive.

Often, the housings of hard disk drives are hermetically sealed to keep contaminants out of the hard disk drives and to maintain an environment within the housing that promotes performance and reliability of the hard disk drives. For example, the housings of certain hard disk drives are hermetically sealed to retain an inert gas (e.g., helium) within the housings.

Traditionally, hermetically sealed housings of hard disk drives include a base with a cover welded to the base by a weld bead, which provides the seal between the base and the cover. Handling of hard disk drives may cause damage to the weld bead. For example, as a hard disk drive is installed into a network server, the weld bead may be damaged due to impacts with the network server. Damage to a weld bead may cause gas within the housing to escape from the housing into the environment and allow contaminants to enter the housing.

SUMMARY

The subject matter of the present application has been developed in response to the present state of the art, and in particular, in response to the shortcomings of hermetically sealed electronic devices, that have not yet been fully solved by currently available techniques. Accordingly, the subject matter of the present application has been developed to provide a shield, and associated electronic device systems, that overcome at least some of the above-discussed shortcomings of prior art techniques.

According to one embodiment, a system includes a hard disk drive. The hard disk drive includes a base and a cover welded to the base by a weld bead. The base and the cover form a hermetically sealed housing. The system further includes a shield, coupled to an exterior of the hermetically sealed housing over the weld bead. The shield also is spaced-apart from the weld bead.

In some implementations of the system, the weld bead extends along an edge of the hermetically sealed housing. The shield bends around the weld bead. The shield may bend at an acute angle.

According to certain implementations of the system, the shield is coupled to the exterior of the hermetically sealed housing via pressure-sensitive adhesive tape. The pressure-sensitive adhesive tape can be interposed directly between the cover and the shield. Furthermore, the pressure-sensitive adhesive tape can cover substantially the entire surface of the shield directly adjacent the cover. The pressure-sensitive adhesive tape may be spaced-apart from the weld bead. In some examples, the pressure-sensitive adhesive tape includes multiple strips of pressure-sensitive adhesive tape. The pressure-sensitive adhesive tape can be interposed directly between the base and the shield. According to certain examples, the shield includes a first recess shaped to complement and matingly receive the pressure-sensitive adhesive tape.

In some implementations of the system, the shield is made from sheet metal. The shield may be made from a polymer in certain implementations.

According to some implementations of the system, the base includes a ridge, extending, at least partially, about the base in a spaced-apart manner relative to the weld bead. The ridge is elevated further away from a side of the base than the weld bead. The shield engages the ridge. The shield may include a second recess shaped to complement and matingly receive the ridge.

In yet some implementations of the system, the shield includes a bulbous bend, and the shield bends around the weld bead at the bulbous bend.

In certain implementations of the system, the shield has a substantially L-shaped cross-section.

According to some implementations of the system, the shield is at least partially flexible.

According to another embodiment, a hard disk drive system includes a hard disk drive. The hard disk drive includes a base and a cover welded to the base by a first weld bead and a second weld bead. The base and the cover form a hermetically sealed housing. The hermetically sealed housing has a first surface, a second surface opposing the first surface, and a third surface extending between the first surface and the second surface. The first weld bead extends along a first external interface between the first surface and the third surface. The second weld bead extends along a second external interface between the second surface and the third surface. The hard disk drive system further includes a first shield coupled to an exterior of the first surface and the third surface of the hermetically sealed housing over the first weld bead and spaced-apart from the first weld bead. Additionally, the hard disk drive system includes a second shield coupled to an exterior of the second surface and the third surface of the hermetically sealed housing over the second weld bead and spaced-apart from the second weld bead.

In yet another embodiment, a shield, for protecting an external weld coupling together a base and a cover of a hermetically sealed housing of a hard disk drive, includes a first planar portion, a second planar portion, and a bend coupling together the first planar portion and the second planar portion to define an acute angle between the first planar portion and the second planar portion. The shield also includes pressure-sensitive adhesive tape adhered to at least one of the first planar portion and the second planar portion. The pressure-sensitive adhesive tape is configured to adhere to at least one of the base and the cover of the hermetically sealed housing to fix the bend over and spaced-apart from the external weld.

According to some implementations of the shield, the pressure-sensitive tape is configured to be removable from at least one of the base and the cover of the hermetically sealed housing.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
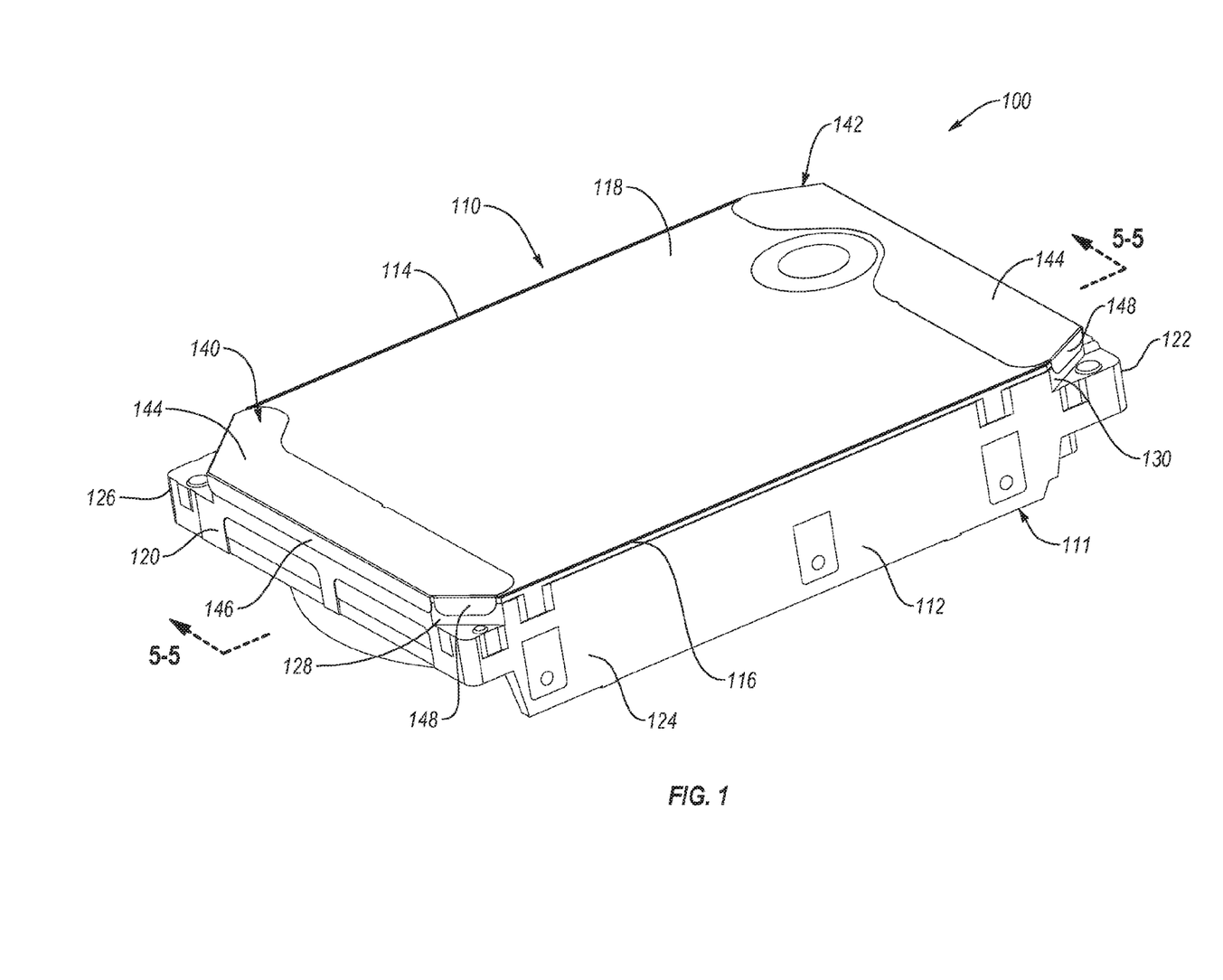
FIG. 1 is a perspective view of a hard disk drive system, according to one or more embodiments of the present disclosure.

Referring to FIG. 1, an electronic device system, according to one embodiment, is depicted as a hard disk drive (HDD) system 100. However, in other embodiments, the electronic device system can be another type of magnetic data storage device system, a non-magnetic data storage system, or another type of electronic device having a hermetically sealed housing that contains electronic components. The HDD system 100 includes an HDD 110 and shields 140, 142 coupled to the HDD 110.

The HDD 110 includes a base 112 and a cover 114 coupled to the base 112 to form a hermetically sealed housing 111. The housing 111 is configured to hermetically seal an interior cavity 152, defined within the housing, from an exterior environment (not shown in FIG. 1; see, e.g., FIG. 5). According to some implementations, the housing 111 maintains the interior cavity 152 of the housing 111 at a pressure below atmospheric pressure.

Figure 5:
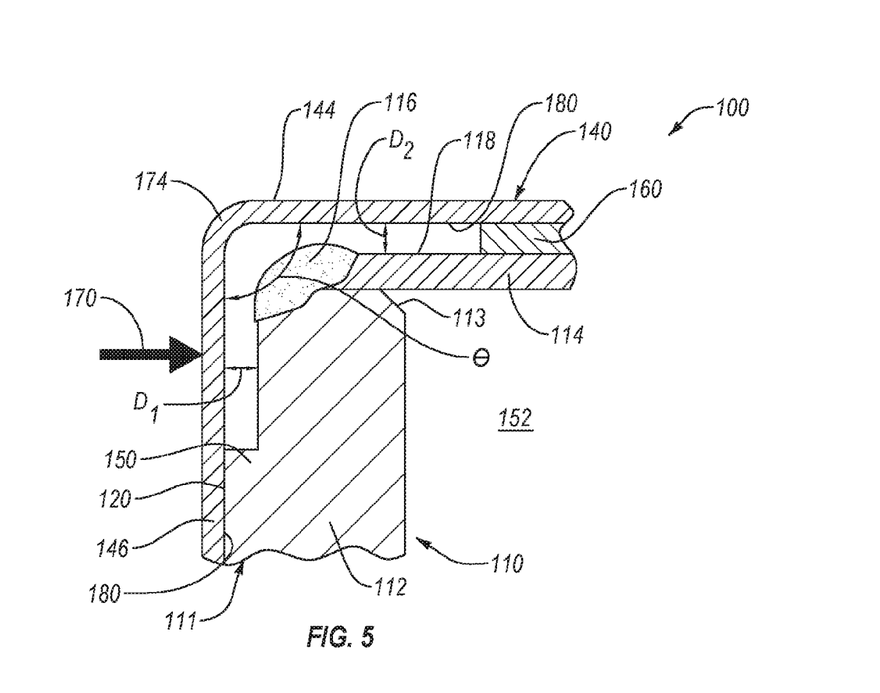
FIG. 5 is a cross-sectional side elevation view of a detail of the hard disk drive system of FIG. 1, taken along the line 5-5 of FIG. 1, according to one or more embodiments of the present disclosure.

The base 112 defines a cavity with an open end 113 (not shown in FIG. 1; see, e.g., FIG. 5). Sidewalls extend about the base 112 to, at least partially, define the cavity. Two opposing sidewalls of the base 112 define first and second end surfaces 120, 122 of the housing 111. The first end surface 120 can form part of an interface connector side of the HDD 110. Two other opposing sidewalls of the base 112 define first and second side surfaces 124, 126 of the housing 111. In certain implementations, to facilitate the attachment of the housing 111 to other components, the base 112 includes diagonal surfaces 128, 130 at respective corners of the base 112. The diagonal surfaces 128, 130 are angled relative to the first and second end surfaces 120, 122 and the first and second side surfaces 124, 126. Additionally, with reference to at least FIG. 2, in the illustrated embodiments, the first and second end surfaces 120, 122 and the diagonal surfaces 128, 130 of the base 112 include a portion of a ridge 150 that extends at least partially about the base adjacent to, but spaced-apart from, the open end 113 of the cavity defined by the base 112. Generally, the ridge 150 is an elevated or protruding portion of the first and second end surfaces 120, 122 and the diagonal surfaces 128, 130. Referring to FIG. 5, the ridge 150 extends or protrudes away from the respective first and second end surfaces 120, 122 and the diagonal surfaces 128, 130 further than the weld bead 116.

The cover 114 is positioned over the cavity of the base to close the open end and form the interior cavity 152. Welding the cover 114 to the base 112 facilitates the hermetic sealing of the interior cavity 152. In other words, a weld bead 116 is formed around an entire periphery of the housing 111 at an external interface between the base 112 and the cover 114 to form a seal between the base 112 and the cover 114. Generally, the external interface between the first end surface 120 of the base 112 and the cover 114 is a first external interface 117 (not shown in FIG. 1; see, e.g., FIG. 2), and the external interface between the second end surface 122 of the base 112 and the cover 114 is a second external interface 119 (not shown in FIG. 1; see, e.g., FIG. 2). The weld bead 116 can be formed using any of various welding techniques in the art to at least partially fuse together the base 112 and the cover 114 by concurrently melting the base 112 and the cover 114 via application of intense heat to the base 112 and the cover 114. For example, the weld bead 116 can be made from a melted and then cooled combination of the materials of the base 112 and the cover 114. Accordingly, the weld bead 116 defines a non-reversible or permanent joint between the base 112 and the cover 114. In certain implementations, a filler material can be added to the melted combination of the materials of the base 112 and the cover 114, via the application of heat, to produce the weld bead 116. The solid and relatively non-porous nature of the weld bead 116 prevents the passage of contaminants and gas through the interface between the base 112 and the cover 114, thus hermetically sealing the housing 111.

The weld bead 116 extends along, and defines, the edges and corners of the housing 111 on a first side (e.g., top side) of the housing 111. In some implementations, the weld bead 116 is substantially flush with an exterior of the housing 111 (e.g., exterior surfaces 118, 120, 122 of the cover 114 and the base 112, respectively). However, in other implementations, as shown, the weld bead 116 protrudes beyond the respective exterior surfaces 118, 120, 122 of the cover 114 and the base 112. The weld bead 116 may define substantially rounded edges and corners of the housing 111. Alternatively, the weld bead 116 may define substantially sharp edges and corners of the housing 111.

The base 112 and cover 114 of the housing 111 can be made from any of various rigid materials (e.g., metals and metal alloys). In some implementations, the base 112 and cover 114 are made from the same materials. However, in other implementations, the base 112 and cover 114 are made from different materials.

Generally, the housing 111 of the HDD 110 sealingly contains and protects, within the interior cavity 152, various internal components configured to store and retrieve data and information, as well as to control the storage and retrieval of data and information. According to one embodiment, the internal components are sensitive to contaminants and pressure changes. Therefore, hermetically sealing the internal components from the exterior environment promotes the proper operation of the HDD 110 and the extension of the life of the HDD 110. Although not shown, the components sealed within the interior cavity 152 of the housing 111 may include magnetic recording media (e.g., hard disks), transducer heads, armatures, spindles, servo motors, electrical circuitry, and the like. Generally, the HDD 110 includes a spindle that is operably connected to the base 112 via a spindle motor coupled to the base 112. The spindle is co-rotatably coupled to the spindle motor such that the spindle motor rotatably drives the spindle. The disks are operably connected to the spindle via respective hubs fixedly secured to respective disks and co-rotatably coupled to the spindle. As the spindle rotates, the disks correspondingly rotate. Accordingly, the spindle motor can be operatively controlled to rotate the disks a controlled amount and at a controlled rate. As the disks rotate, a servo motor positions the armatures and the transducer heads connected to each armature, such that the heads are positioned over a specified radial area of the disks for read or write operations.

The HDD 110 can be in electrical communication with a computing device (not shown) to store and transfer data associated with operation of the computing device. Further, the HDD 110 can be physically installed into or coupled to the computing device. Often, the HDD 110 is installed into the computing device (e.g., a network server) by inserting the HDD 110 into the computing device in a direction corresponding with the directional arrow 170 (see, e.g., FIG. 5). In some instances, as the HDD 110 is moving in the direction corresponding with the directional arrow 170, the HDD 110 may impact various objects, such as internal walls of the computing device, which impart an impact force to the HDD 110 in the same direction. For example, the HDD 110 may be over-inserted into the computing device or inserted into the computing device with excessive force such that the HDD 110 unintentionally impacts a portion of the computing device. Although less common, installation of the HDD 110 into the computing device may result in objects impacting the HDD 110 in the direction corresponding with directional arrow 172 (see, e.g., FIG. 6), which impart an impact force to the HDD 110 in the same direction. In addition to the installation of the HDD 110 into a computing device, general handling of the HDD 110 prior to, during, or after installation may result in objects impacting the HDD 110 to impart impact forces to the HDD 110 in one or both of the directions corresponding with directional arrows 170, 172.

The impacts to the HDD 110, particularly the weld bead 116, may damage the weld bead 116 such that the hermetic seal provided by the weld bead 116 is broken. A broken seal resulting from a damaged weld bead 116 may allow the gas within the interior cavity 152 of the housing 111 to leak from the housing 111 and/or allow contaminants to enter the interior cavity 152 of the housing 111. To reduce damage to the weld bead 116 caused by impacts to the weld bead 116, the weld bead 116 can be shielded by one or both of the shields 140, 142, coupled to the exterior of the housing 111. Generally, the shields 140, 142 are coupled to the exterior of the housing 111 such that the shields 140, 142 are positioned over the portions of the weld bead 116 of the housing 111 most susceptible to impacts during installation and handling of the HDD 110. For example, as shown in FIG. 1, the shield 140 is positioned over the weld bead 116 along the first end surface 120, and the shield 142 is positioned over the weld bead 116 along the second end surface 122. a shield 140, 142 is configured to receive and at least partially absorb impacts to the HDD 110 that normally would impact the weld bead 116. For example, referring to FIG. 5, an impact, from an object, in the general direction indicated by directional arrow 170 impacts the shield 140 instead of impacting the weld bead 116. As another example, referring to FIG. 6, an impact, from an object, in the general direction indicated by directional arrow 172 impacts the shield 140 instead of impacting the weld bead 116. Additionally, because the shield is spaced apart from the weld bead 116, such that a gap exists between the shield and the weld bead 116, impacts to the shields 140, 142 are not transferred directly to the weld bead 116.

A shield 140, 142 includes a first portion (e.g., base plate 144) and at least one second portion (e.g., tabs 146, 148). In the illustrated embodiments, a shield 140, 142 includes one tab 146 and two tabs 148. However, in other embodiments, a shield 140, 142 may include fewer or more than one tab 146 and two tabs 148. The base plate 144 and tabs 146, 148 are configured to respectively engage (e.g., be mounted onto) the exterior surface 118 of the cover 114 and the exterior surfaces 120, 122, 128, 130 of the base 112. More specifically, the base plate 144 of a shield 140, 142 engages the exterior surface 118 of the cover 114, the tab 146 of a shield 140, 142 engages a respective one of the exterior surfaces 120, 122 of the base 112, and the tabs 148 of a shield 140, 142 each engage a respective one of the exterior diagonal surfaces 128, 130 of the base 112.

To facilitate engagement with the exterior surfaces of the housing 111, in some embodiments, the base plate 144 and tabs 146, 148 are configured according to the configuration of the exterior surfaces of the housing 111. For example, the base plate 144 and tabs 146, 148 can be sized and shaped to complement the size and shape of the exterior surfaces of the housing 111. In one embodiment, such as shown, the exterior surfaces of the housing 111 are substantially flat. Accordingly, as shown, the base plate 144 and tabs 146, 148 can be substantially flat or planar to complement the shape of the exterior surfaces. Moreover, in certain embodiments, such as shown, the exterior surface 118 of the cover 114 is perpendicular to the first and second end surfaces 120, 122 and the diagonal surfaces 128, 130. Therefore, as shown, the base plate 144 can be near perpendicular to the tabs 146, 148, such that the shields 140, 142 are substantially L-shaped in cross-section (see, e.g., FIG. 5). Although the base plate 144 and tabs 146, 148 of the illustrated embodiment are flat or planar and the base plate 144 is perpendicular to the tabs 146, 148, in other embodiments, the base plate 144 and tabs 146, 148 are not planar and/or the base plate 144 does not extend perpendicular to the tabs 146, 148 depending on the configuration of the exterior surfaces of the housing 111 to which the shields 140, 142 are engaged. In some embodiments, the shields 140, 142 may be shaped to accommodate features of the HDD 110. For example, the shield 142 includes a cut-out 145 (see, e.g., FIG. 3) to accommodate a circular feature in the cover 114.

Figure 2:
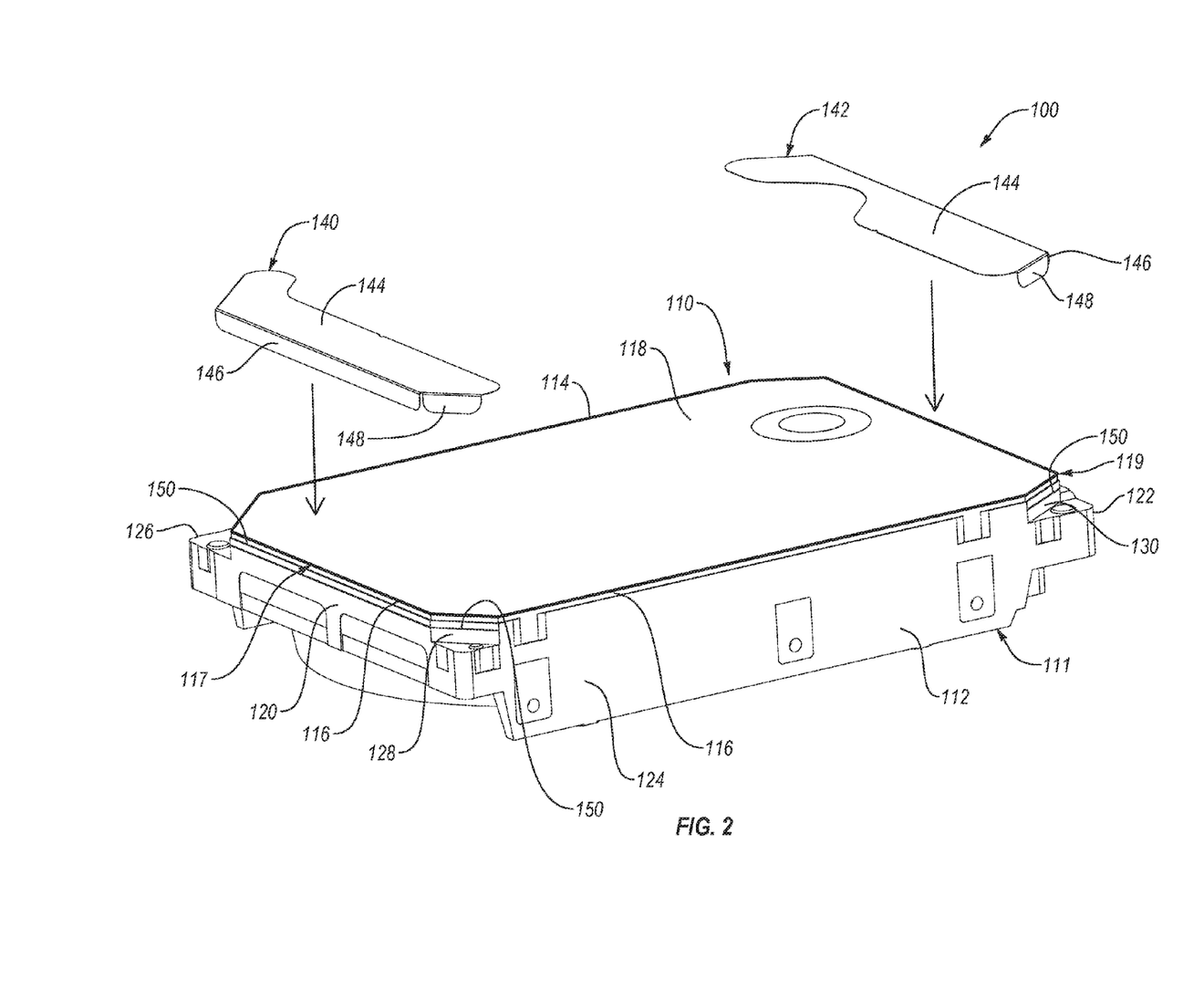
FIG. 2 is an exploded perspective view of the hard disk drive system of FIG. 1, according to one or more embodiments of the present disclosure.

The base plate 144 and tabs 146, 148 are joined together at a bend 174 (see, e.g., FIG. 5). Moreover, as shown in FIG. 2, the tabs 146, 148 may be spaced apart from each other to facilitate bending of the tabs 146, 148, which are diagonal relative to each other, relative to the base plate 144.

A shield 140, 142 can be made from any of various materials capable of receiving and at least partially withstanding an impact from an object conventionally encountered during the installation and handling of the HDD 110. In some implementations, a shield 140, 142 is made from a rigid and durable material, such as a metal or metal alloy (e.g., stainless steel, aluminum, and the like) or a hardened polymeric material. According to certain implementations, a shield 140, 142 is made from a material that is at least partially flexible. For example, a shield 140, 142 can be made from a material that flexes, and in some cases resiliently flexes, to absorb the force of an impact as mechanical deformation. To reduce outwardly directed flexing of the shields 140, 142 due to an impact to the shields from an object, the base plate 144 and tabs 146, 148 may be oriented relative to each other such that an acute angle θ (see, e.g., FIG. 5) is defined between the base plate 144 and the tabs 146, 148. As defined herein, an acute angle is any angle that is less than 90-degrees. The acute angle θ defined between the base plate 144 and tabs 146, 148 may result in the base plate 144 being nearly, but not entirely, flush with (e.g., parallel to) the exterior surface 118 of the cover 114, and/or the tabs 146, 148 being nearly, but not entirely, flush with the exterior surfaces 120, 122 and diagonal surfaces 128, 130, respectively. As will be described in more detail below, any lack of flushness between exterior surfaces of the housing 111 and the base plate 144 or tabs 146, 148 of the shields 140, 142, as a result of the acute angle θ, may be compensated for with the flex or deformation of the pressure-sensitive adhesive tape 160 (see, e.g., FIG. 5), such that the shields 140, 142 may still be mounted securely to the housing 111.

The shields 140, 142 can be formed using any of various manufacturing techniques. According to one embodiment, the shields 140, 142 are formed by cutting (e.g., punching) a footprint of the shields 140, 142 from sheet metal and bending the tabs 146, 148 relative to the base plate 144. In alternative embodiments, the shields 140, 142 are molded using a molding process, such as injection molding and compression molding. For example, shields with non-uniform thicknesses or complex shapes, such as shield 240 of FIG. 7, can be made from a polymer using a molding process.

The shields 140, 142 are mounted to the exterior surfaces of the housing 111 of the HDD 110 using any of various techniques. According to the illustrated embodiments, the shields 140, 142 are mounted to the exterior surfaces of the housing 111 using an adhesive. In some implementations, the adhesive is a pressure-sensitive adhesive tape 160, such as a double-sided adhesive tape, which includes a pressure-sensitive adhesive on opposing sides of a strip of material. Generally, with the pressure-sensitive adhesive tape 160 positioned (e.g., interposed directly) between the shields 140, 142 and at least one exterior surface of the housing 111, the shields 140, 142 and the housing 111 are pressed together to at least partially compress the tape, activate the adhesive on the tape, and adhere the shields 140, 142 to the housing 111.

Figure 3:
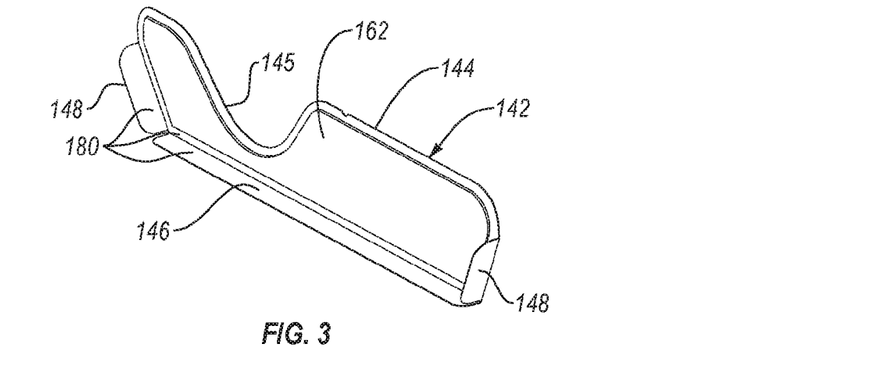
FIG. 3 is a perspective view of a shield of the hard disk drive system of FIG. 1, according to one or more embodiments of the present disclosure.

The pressure-sensitive adhesive tape 160 can be positioned (e.g., directly interposed) between the shields 140, 142 and the housing 111 using any of various techniques. For example, the pressure-sensitive adhesive tape 160 can be first applied onto the exterior surfaces of the housing 111, and then the shields 140, 142 can be pressed onto the pressure-sensitive adhesive tape 160. Alternatively, as shown in FIG. 3, the pressure-sensitive adhesive tape, represented as pressure-sensitive tape 162, can be first applied onto the shields 140, 142, and then the shields 140, 142, with the pressure-sensitive adhesive tape 160, can be pressed onto the exterior surfaces of the housing 111. For example, the pressure-sensitive adhesive tape 160 can be applied onto one or more of the interior surfaces 180 of the base plate 144 and tabs 146, 148 of the shields 140, 142.

Referring to FIG. 5, and according to one embodiment, the shields 140, 142 are mounted to the housing 111 of the HDD 110 with pressure-sensitive adhesive tape 160 between the base plate 144 of the shields and the cover 114 of the housing 111. The pressure-sensitive adhesive tape 160 adheres to the interior surface 180 of the base plate 144 on one side of the tape and adheres to the exterior surface 118 of the cover 114 on the opposing side of the tape. The thickness of the pressure-sensitive adhesive tape 160 is selected to offset the base plate 144 of the shields 140, 142 from the weld bead 116 by a distance $D_2$. In other words, due to the thickness of the pressure-sensitive adhesive tape 160, a gap or space equal to the distance $D_2$ is defined between the weld bead 116 and the base plate 144 of the shields 140, 142. The thickness of the pressure-sensitive adhesive tape 160 can be selected to provide a desired distance $D_2$ between the weld bead 116 and the base plates 114. The pressure-sensitive adhesive tape 160 maintains the shields 140, 142 in place on the housing 111 during handling and installation of the HDD 110. Also, the pressure-sensitive adhesive tape 160 absorbs at least some of the impact force exerted on the base plate 144.

Moreover, the base plates 144 of the shields 140, 142 are positioned on the cover 114 such that the tabs 146, 148 engage (e.g., contact or rest on) the first and second end surfaces 120, 122 and the diagonal surfaces 128, 130, respectively. For example, as shown in FIG. 5, the base plate 144 of the shield 140 is positioned on the cover 114 such that tab 146 is in contact with the first end surface 120 of the base 112. With the tabs engaged with the external surfaces of the base 112, impacts to the tabs of the shields are transferred to the base 112. In this manner, impacts directed towards the weld bead 116 are transferred to the base 112 via the tabs of the shields, rather than directly impacting the weld bead 116.

Additionally, in some embodiments, the tabs 146, 148 engage the first and second end surfaces 120, 122 and the diagonal surfaces 128, 130 of the ridge 150. Because the ridge 150 extends or protrudes away from the respective first and second end surfaces 120, 122 and the diagonal surfaces 128, 130 further than the weld bead 116, as described above, engagement with the ridge 150 offsets the tabs 146, 148 of the shields 140, 142 from the weld bead 116 by a distance $D_1$. In other words, due to the engagement between the tabs 146, 148 and the ridge 150, a gap or space equal to the distance $D_1$ is defined between the weld bead 116 and the tabs 146, 148 of the shields 140, 142. The height of the ridge 150 can be selected to provide a desired distance $D_1$ between the weld bead 116 and the tabs 146, 148. It is recognized that because a gap is defined between the base plate 144 and tabs 146, 148 of the shields 140, 142 and the weld bead 116, a gap also exists between the bend 174 and the weld bead 116. As shown in FIG. 5, the gap between the bend 174 of the shields 140, 142 and the weld bead 116 can be greater than the gaps between the base plate 144 and tabs 146, 148 of the shields 140, 142 and the weld bead 116.

Figure 6:
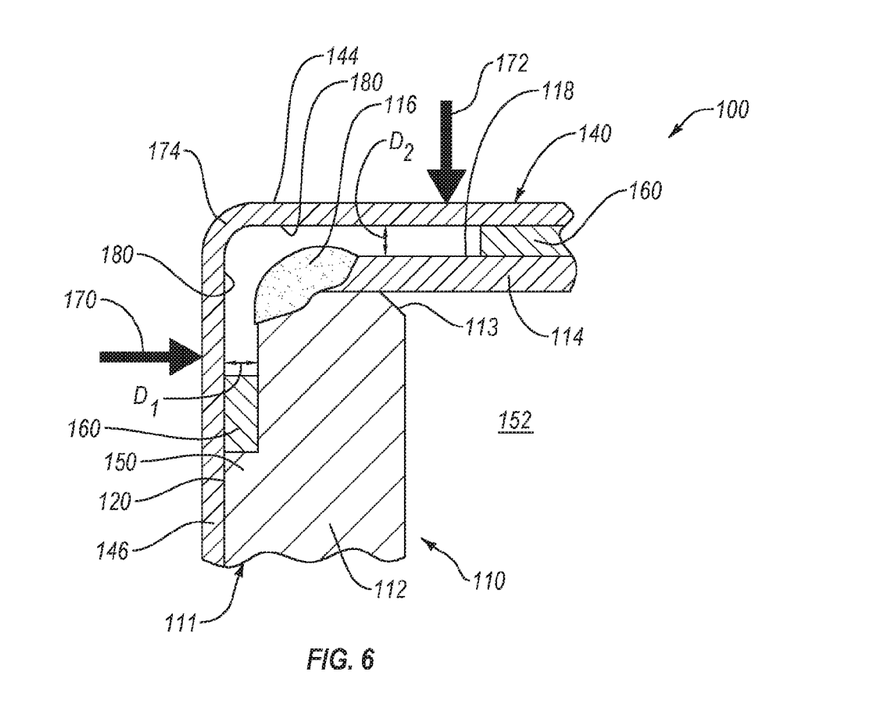
FIG. 6 is a cross-sectional side elevation view of a detail of a hard disk drive system, according to one or more embodiments of the present disclosure.

Referring to FIG. 6, and according to one embodiment, not only are the shields 140, 142 mounted to the housing 111 of the HDD 110 with pressure-sensitive adhesive tape 160 between the base plate 144 of the shields and the cover 114 of the housing 111, but also with pressure-sensitive adhesive tape 160 between the tabs 146, 148 and the base 112. The additional pressure-sensitive adhesive tape 160 adheres to the interior surface 180 of the tabs 146, 148 on one side of the tape and adheres to the exterior surface 118 of the base 112 on the opposing side of the tape. The pressure-sensitive adhesive tape 160 between the tabs 146, 148 and the base 112 helps the shields 140, 142 absorb and withstand impact forces in the direction corresponding with the directional arrow 170. In some implementations, the additional pressure-sensitive adhesive tape 160 adheres to the first and second end surfaces 120, 122 of the base 112 at a location adjacent to the ridge 150. In other words, the additional pressure-sensitive adhesive tape 160, in some implementations, is not adhered to the ridge 150, but abuts the ridge 150 if desired.

Generally, in certain embodiments, the pressure-sensitive adhesive tape 160 is removable from the housing 111. As used herein, removable means removable without permanent damage to or deformation of the housing. According to some embodiments, the surface finish of the exterior surfaces 118, 120, 122 of the base 112 and/or cover 114 of the housing 111 is different than the surface finish of the interior surface 180 of the base plate 144 and/or tabs 146, 148 of the shields 140, 142 such that the pressure-sensitive adhesive tape 160 affixes more strongly to the shields 140, 142 than the housing 111. Accordingly, as a shield 140, 142 is removed from the housing 111, the pressure-sensitive adhesive tape 160 debonds from the housing 111, but remains bonded or adhered to the shield, such that the pressure-sensitive adhesive tape 160 is removed with the shield. Because the pressure-sensitive adhesive tape 160 remains adhered to the shield, rather than the housing 111, the HDD 110 to which the shield was adhered can be reused. Alternatively, the pressure-sensitive adhesive tape 160 may be configured to have a first adhesive with a first adhesion strength on a first side of the tape and a second adhesive with a second adhesion strength, weaker than the first adhesion strength, on a second, opposite, side of the tape. By orienting the pressure-sensitive adhesive tape 160 such that the first adhesive, with a stronger adhesion strength, is adhered to the interior surfaces 180 of the shield and the second adhesive, with a weaker adhesion strength, is adhered to the exterior surfaces of the housing 111, the tape will remain adhered to the shields as they are removed from the housing 111 and will debond from the housing.

Figure 7:
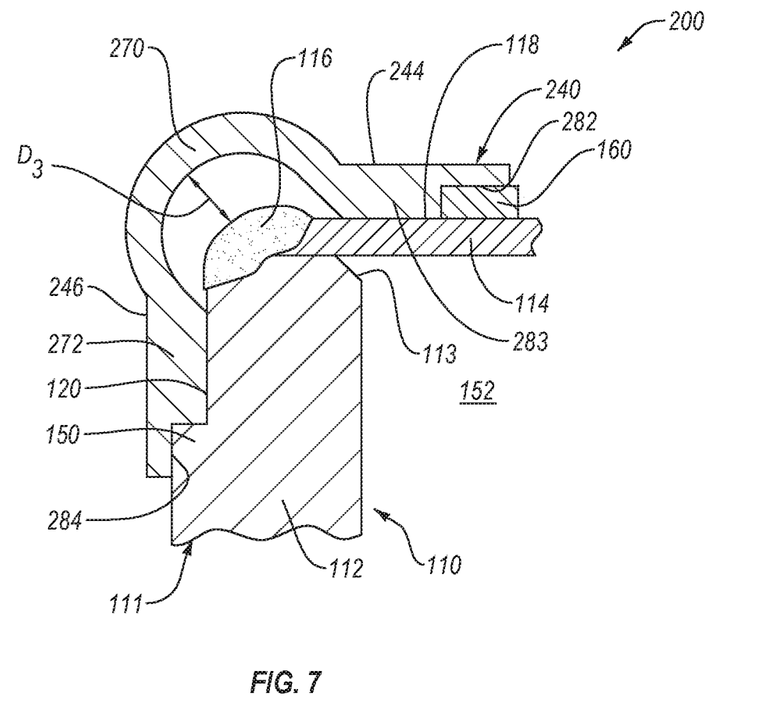
FIG. 7 is a cross-sectional side elevation view of a detail of a hard disk drive system, according to one or more embodiments of the present disclosure.

As shown in FIG. 7, according to one embodiment, an HDD system 200 includes the shield 242 with a bulbous bend 270 that couples together a base plate 244 and a tab 246 of the shield 242. The bulbous bend 270 is substantially semi-circular in cross-section such that, when the shield 242 is mounted on the housing 111, the bulbous bend 270 extends approximately 180-degrees about the weld bead 116. Moreover, the bulbous bend 270 is sized to define a gap, up to a distance $D_3$, between the bulbous bend 270 and the weld bead 116 about the entire bulbous bend 270. Furthermore, base plate 244 of the shield 242 may include a first recess 282 that matingly receives the pressure-sensitive adhesive tape 160. The first recess 282 is sized to allow the pressure-sensitive adhesive tape 160 to be adhered to the exterior surface 118 of the cover 114, while matingly received within the first recess 282. Additionally, in some implementations, a portion or ridge 283 of the base plate 244 is configured to directly contact the exterior surface 118 of the cover, while the pressure-sensitive adhesive tape 160 adheres base plate 244 to the exterior surface 118. Direct contact between the exterior surface 118 and the ridge 283 facilitates the transfer of impact forces from the base plate 244 of the shield to the cover 114 of the housing 111. The ridge 283 may at least partially define the first recess 282.

Similar to the first recess 282 in the base plate 244, the shield 242 may also include a second recess 284 formed in the tab 246. The second recess 284 is configured to matingly receive the ridge 150 of the base 112. Mating engagement between the second recess 284 and the ridge 150 facilitates the transfer of impact forces from the tab 246 of the shield to the base 112 of the housing 111. Additionally, in some implementations, a portion or ridge 272 of the tab 246 is configured to directly contact the first end surface 120 of the base 112 while the ridge 150 is matingly received within the second recess 284. The ridge 150 may at least partially define the second recess 284.

Figure 4:
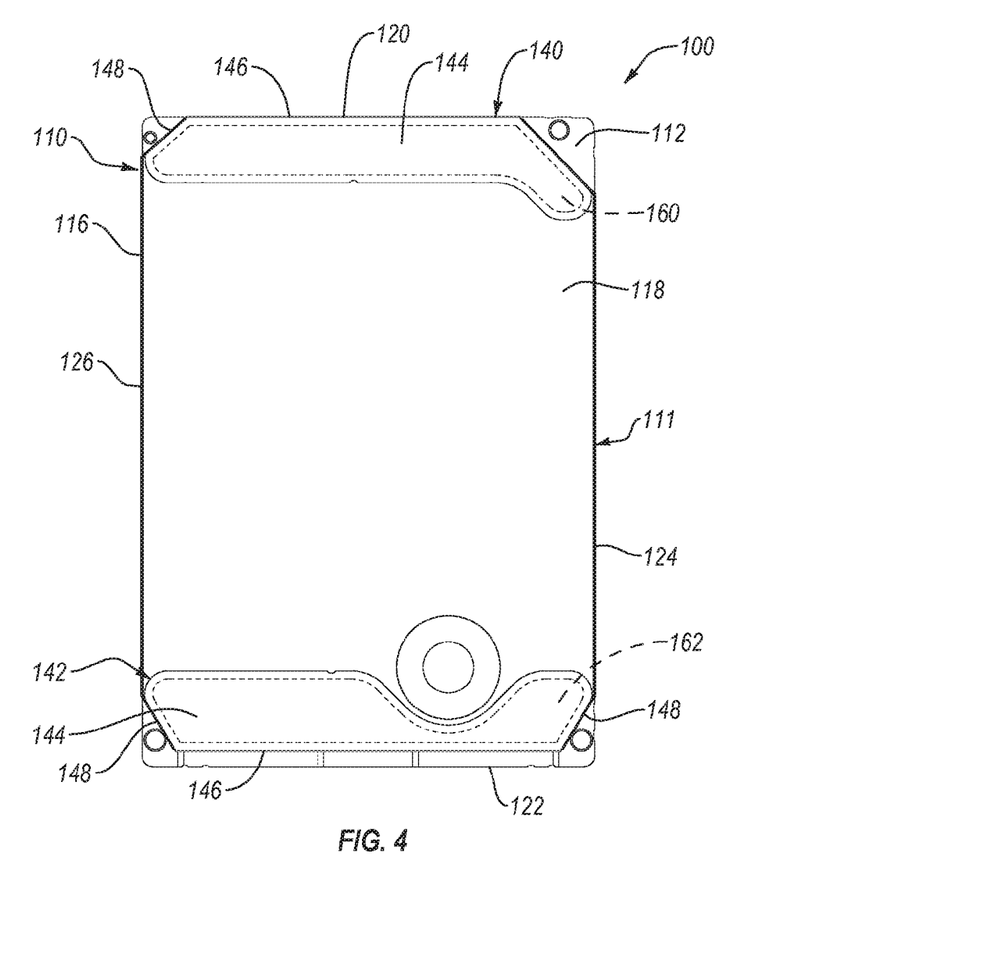
FIG. 4 is a top plan view of the hard disk drive system of FIG. 1, according to one or more embodiments of the present disclosure.

Referring to FIGS. 3 and 4, a single strip or piece of the pressure-sensitive adhesive tape 162 covers substantially the entire interior surface 180 of the base plate 144 of the shield 142. Similarly, a single strip or piece of a pressure-sensitive adhesive tape 160 covers substantially the entire interior surface 180 of the base plate 144 of the shield 140. Moreover, the shape of the single strip of the pressure-sensitive adhesive tape 160, 162 complements or is the same as the shape of the interior surface 180 of the respective base plate 144 of the shields 140, 142. Although the pressure-sensitive adhesive tape 160, 162 covers substantially the entire interior surface 180 of the respective base plates 144 of the shields 140, 142, the pressure-sensitive adhesive tape 160, 162 is spaced apart from, or does not cover, the weld bead 116 when the shields 140, 142 are mounted on the housing 111 of the HDD 110. Accordingly, when pressure is applied to the pressure-sensitive adhesive tape 160, 162 to activate the adhesive to secure the shields 140, 142 to the housing 111 of the HDD 110, direct pressure on the weld bead 116 is avoided.

Figure 8:
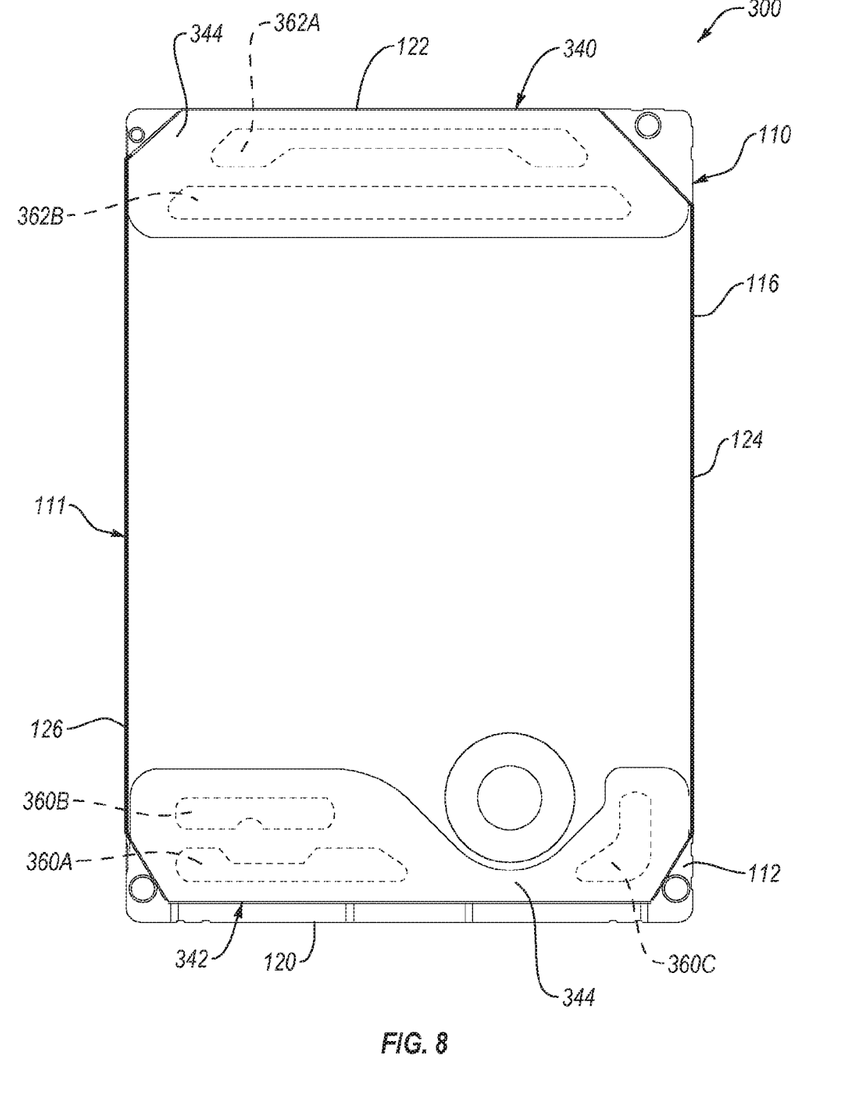
FIG. 8 is a top plan view of a hard disk drive system, according to one or more embodiments of the present disclosure.

Referring to FIG. 8, to reduce weight and material, multiple spaced-apart strips or pieces of pressure-sensitive tape 360A-C may be used to only partially cover the interior surface of a base plate 344 of a shield 342, which is similar to shield 142. Similarly, multiple spaced-apart strips or pieces of pressure-sensitive tape 362A-B may be used to only partially cover the interior surface of a base plate 344 of a shield 340, which is similar to the shield 140. Moreover, the strips of pressure-sensitive adhesive tape 360A-C and 362A-B are positioned on the interior surface of the respective base plate 344 of the shields 340, 342 such that the strips of pressure-sensitive adhesive tape are spaced apart from, or do not cover, the weld bead 116 when the shields 340, 342 are mounted on the housing 111 of the HDD 110 of the HDD system 300. In this manner, when pressure is applied to the strips of pressure-sensitive adhesive tape 360A-C, 362A-B to activate the adhesive for securing the shields 340, 342 to the housing 111 of the HDD 110, direct pressure on the weld bead 116 is avoided.

Although HDD systems with two shields mounted to a housing of an HDD over weld beads adjacent opposing end surfaces of the housing are shown, in other embodiments, HDD systems can have one or more than two shields mounted to the housing of the HDD of the HDD systems as desired without departing from the essence of the present disclosure.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A system, comprising:
    a hard disk drive, comprising:
        a base; and
        a cover welded to the base by a weld bead;
        wherein the base and the cover form a hermetically sealed housing; and
    a shield, coupled to an exterior of the hermetically sealed housing over the weld bead and spaced-apart from the weld bead such that a gap is defined between the shield and the weld bead.

2. The system according to claim 1, wherein:
    the weld bead extends along an edge of the hermetically sealed housing; and
    the shield bends around the weld bead.

3. The system according to claim 2, wherein the shield bends at an acute angle.

4. The system according to claim 1, wherein the shield is coupled to the exterior of the hermetically sealed housing via pressure-sensitive adhesive tape.

5. The system according to claim 4, wherein the pressure-sensitive adhesive tape is interposed directly between the cover and the shield.

6. The system according to claim 5, wherein the pressure-sensitive adhesive tape covers substantially an entire surface of the shield directly adjacent the cover.

7. The system according to claim 5, wherein the pressure-sensitive adhesive tape is spaced-apart from the weld bead.

8. The system according to claim 5, wherein the pressure-sensitive adhesive tape comprises multiple strips of pressure-sensitive adhesive tape.

9. The system according to claim 4, wherein the pressure-sensitive adhesive tape is interposed directly between the base and the shield.

10. The system according to claim 4, wherein the shield comprises a recess shaped to complement and matingly receive the pressure-sensitive adhesive tape.

11. The system according to claim 1, wherein the shield is made from sheet metal.

12. The system according to claim 1, wherein the shield is made from a polymer.

13. The system according to claim 1, wherein:
the base comprises a ridge, extending, at least partially, about the base in a spaced-apart manner relative to the weld bead, the ridge being elevated further away from a side of the base than the weld bead; and
the shield engages the ridge.

14. The system according to claim 13, wherein the shield comprises a recess shaped to complement and matingly receive the ridge.

15. The system according to claim 1, wherein:
the shield comprises a bulbous bend; and
the shield bends around the weld bead at the bulbous bend.

16. The system according to claim 1, wherein the shield has a substantially L-shaped cross-section.

17. The system according to claim 1, wherein the shield is at least partially flexible.

18. A hard disk drive system, comprising:
a hard disk drive, comprising:
a base; and
a cover welded to the base by a first weld bead and a second weld bead;
wherein:
the base and the cover form a hermetically sealed housing having a first surface, a second surface opposing the first surface, and a third surface extending between the first surface and the second surface;
the first weld bead extends along a first external interface between the first surface and the third surface; and
the second weld bead extends along a second external interface between the second surface and the third surface;
a first shield, coupled to an exterior of the first surface and the third surface of the hermetically sealed housing over the first weld bead and spaced-apart from the first weld bead such that a first gap is defined between the first shield and the first weld bead; and
a second shield, coupled to an exterior of the second surface and the third surface of the hermetically sealed housing over the second weld bead and spaced-apart from the second weld bead such that a second gap is defined between the second shield and the second weld bead.

* * * * *